United States Patent [19]
Harvey

[11] Patent Number: 5,533,303
[45] Date of Patent: Jul. 9, 1996

[54] DOWNSPOUT WATER CONSERVATION DIVERSION ADAPTOR

[76] Inventor: Robert B. Harvey, 261 Hiatt La., Central Point, Oreg. 97502

[21] Appl. No.: 423,929

[22] Filed: Apr. 18, 1995

[51] Int. Cl.⁶ .................................................... E03B 3/02
[52] U.S. Cl. ............................ 52/16; 52/169.5; 137/357; 137/861; 47/27; 239/208; 239/193
[58] Field of Search ................... 52/16, 169.5; 239/208, 239/289, 193, 586, 569, 574, 562, 391; 210/418, 420, 428, 433.1; 47/27 C, 66 C; 137/357, 861

[56] References Cited

U.S. PATENT DOCUMENTS

| | | | |
|---|---|---|---|
| 1,693,556 | 11/1928 | Spencer | 239/208 |
| 3,271,913 | 9/1966 | Fields . | |
| 5,114,594 | 5/1992 | Rosebrock et al. . | |
| 5,220,755 | 6/1993 | Roles . | |
| 5,301,474 | 4/1994 | Carey, II et al. . | |
| 5,315,090 | 5/1994 | Lowenthal . | |

FOREIGN PATENT DOCUMENTS 2241276  8/1991  United Kingdom .................... 52/16

Primary Examiner—Carl D. Friedman
Assistant Examiner—Robert J. Canfield
Attorney, Agent, or Firm—Jacobson, Price, Holman & Stern

[57] ABSTRACT

A downspout water conservation diversion adaptor is provided for insertion within the lower part of an upstanding downspout and is selectively operable to divert water flowing downward through the downspout laterally outwardly of the adaptor and along a building wall outwardly beyond which a roof eaves projects for irrigation of ground vegetation disposed beneath the eaves. The adaptor is constructed to automatically bypass excess water flowing downwardly to the adaptor, in excess of that water which may be laterally outwardly directed from the adaptor, in a manner such that the excess water is discharged from the bottom of the downspout. Further, the adaptor includes a provision whereby, in the absence of rain, a garden hose or the like may have the discharge end thereof sealingly connected with the adaptor in order to supply irrigation water to the interior of the adaptor in a manner such that the irrigation water may be conveyed laterally outwardly of the adaptor and utilized for irrigating the same ground vegetation.

3 Claims, 3 Drawing Sheets

5,533,303

1

DOWNSPOUT WATER CONSERVATION DIVERSION ADAPTOR

BACKGROUND OF THE INVENTION

1. Field of the Invention

This invention relates to a rain water conservation system whereby rain water collected in a roof gutter and downspout system of a building, including a roof eaves extension projecting considerably outwardly of one wall, may be conveyed along a lower portion of that building wall and discharged onto the ground at points spaced along the wall for watering landscaping plants beneath the roof eaves which otherwise do not receive rain water directly. Also, the invention incorporates a feature by which a water supply hose may be attached to the lower end of the associated downspout for watering the landscaping plants beneath the eaves even when it has not rained.

2. Description of Related Art

Various different structures for collecting rain water falling upon a roof heretofore have been provided and some of these structures incorporate features wherein lawn and other ground areas remote from a gutter system downspout may be watered with water collected from the roof.

Examples of these previously known devices are disclosed in U.S. Pat. Nos. 3,271,913, 5,114,594, 5,220,755, 5,301,474 and 5,315,090. However, these previously patented structures do not include the specific arrangement of component parts incorporated in the instant invention or all of the operating features thereof.

SUMMARY OF THE INVENTION

The downspout water conservation system of the instant invention includes, in conjunction with a conventional rain gutter and downspout system, means for conveying collected water, up to a given flow rate, along an associated building wall and for discharging the conveyed water at points spaced along the wall for watering adjacent vegetation. In addition, the downspout water conservation system includes structure for discharging, in the usual manner, of all water flowing down the associated downspout in excess of the aforementioned predetermined flow rate. Still further, the downspout water conservation system additionally includes structure whereby water from a conventional garden hose or the like may be supplied to the lower end of the associated downspout at any flow rate up to the aforementioned predetermined flow rate and wherein the garden hose supplied water then will be conveyed and discharged at points spaced along the aforementioned building wall for watering adjacent vegetation whenever rain water is not available for such watering purposes.

The main object of this invention is to provide a rain water conservation system whereby rain water falling upon a roof may be collected through a conventional gutter system and discharged into a conventional downspout and thereafter conveyed and discharged at points spaced along the lower portion of an associated building wall for watering vegetation adjacent that wall.

Another object of this invention is to provide a water conservation system in accordance with the preceding object and capable of diverting water falling downward through an associated downspout up to a predetermined flow rate for irrigation purposes along an associated building wall.

2

Yet another important object of this invention is to provide a downspout water conservation system in accordance with the preceding objects and which will also be capable of conventional downspout lower end discharge of excess water flowing downwardly through the downspout above the heretofore mentioned predetermined rate.

Still another object of this invention is to provide a downspout water conservation system including structure whereby, in the event of long periods without rain, water may be supplied to the lower end of the downspout (from a conventional garden hose or the like) and conveyed and discharged at points spaced along the aforementioned building wall.

A final object of this invention to be specifically enumerated herein is to provide a downspout water conservation system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT OF THE INVENTION

Figure 1:
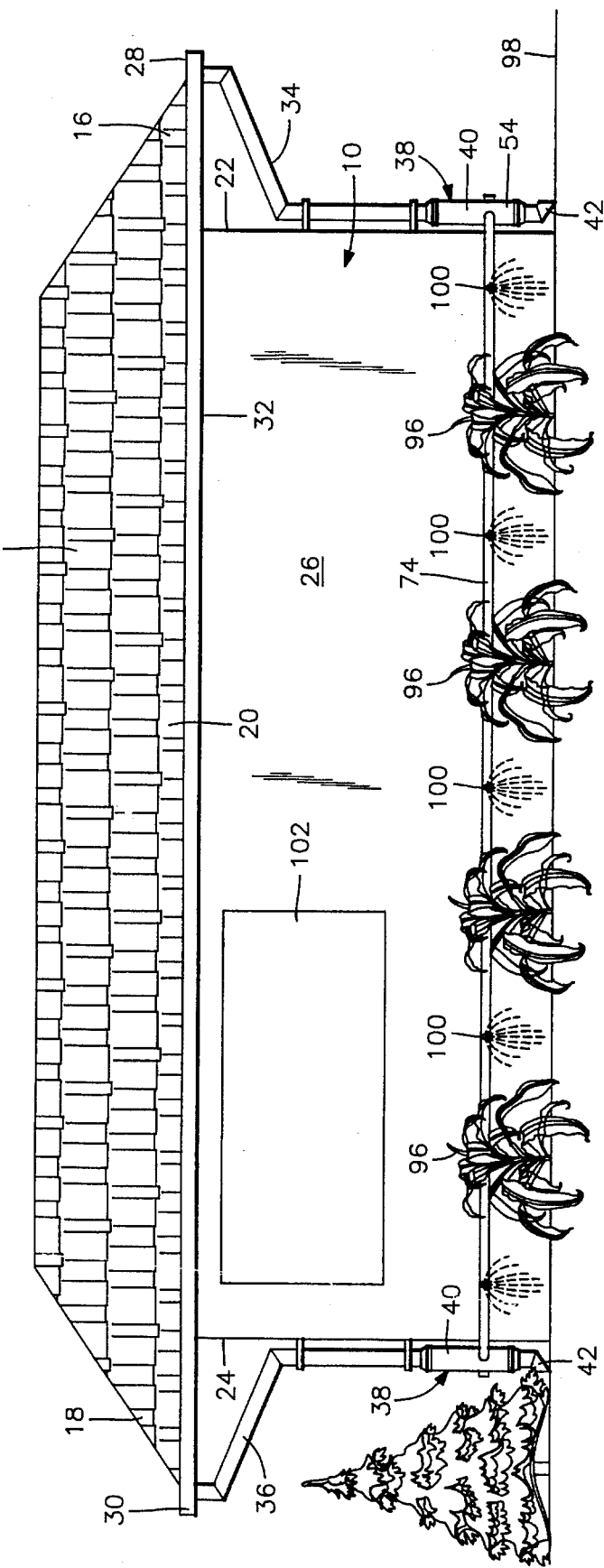
FIG. 1 is a side elevational view of a conventional residential building including a roof with a conventional rain water collecting gutter and downspout system and wherein the lower extremities of the downspouts of the system are constructed in accordance with the present invention for watering vegetation spaced along a wall of the building over which an eaves portion of the roof projects considerably.

Referring now more specifically to FIG. 1 of the drawings, the numeral 10 generally designates a conventional residential building including a roof structure 12. The roof structure 12 includes peripheral eaves 16, 18 and 20 which project considerably horizontally outwardly of corresponding walls 22, 24 and 26 of the building 10. The roof structure 12 also includes peripheral gutters 28, 30 and 32 extending along the walls 22, 24 and 26 outwardly thereof and the gutters include downspouts 34 and 36 at the opposite ends of the wall 26.

Each of the downspouts 34 and 36 is equipped with a water conservation diversion adaptor referred to in general by the reference numeral 38.and each adaptor 38 incorporates an upstanding tubular body 40 preferably constructed of durable plastic so as to be long lasting and relatively inexpensive to produce.

Each downspout 34 and 36 has an intermediate portion thereof immediately above the lower end discharge elbow 42 cut away and the corresponding adaptor 38 is installed in place of the cut away portion. An upper tubular adaptor 44 establishes a fluid type connection between the upper portion of each downspout 34 and the upper end of the corresponding body 40 while a lower adaptor 46 establishes a fluid type connection between the lower end of the corresponding body 40 and the associated downspout lower terminal end discharge elbow 42.

Figure 2:
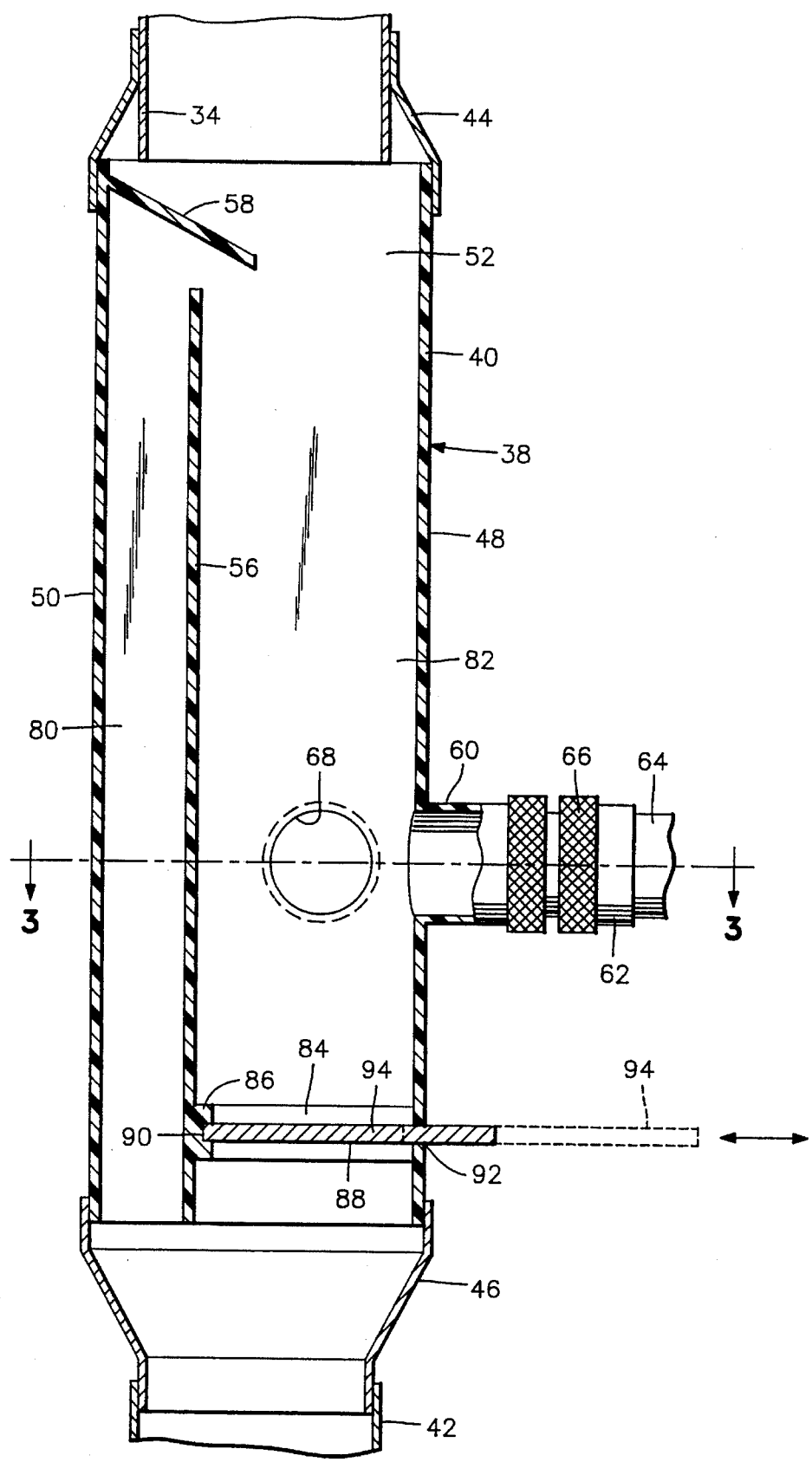
FIG. 2 is an enlarged fragmentary vertical section view of the lower portion of the downspout illustrated at the right hand side of FIG. 1.
Figure 3:
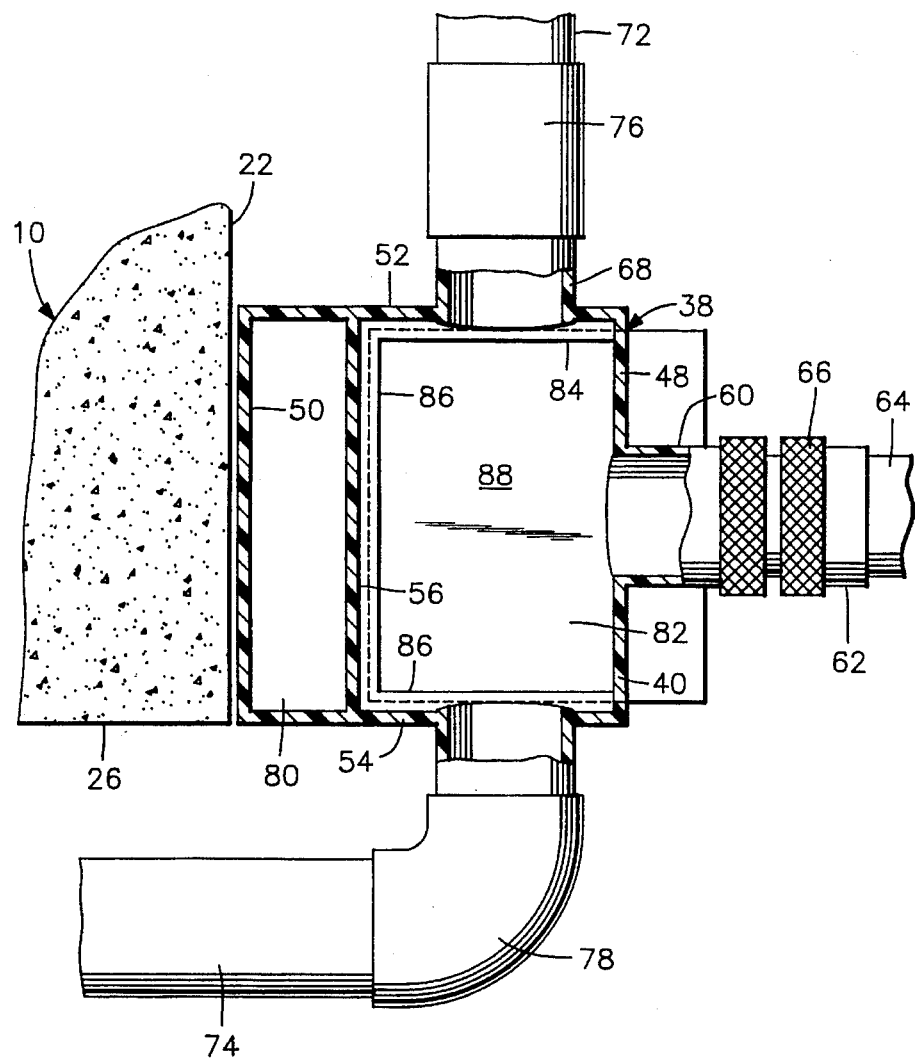
FIG. 3 is a fragmentary horizontal sectional view taken substantially upon the plane indicated by the section line 3—3 of FIG. 2.
Figure 4:
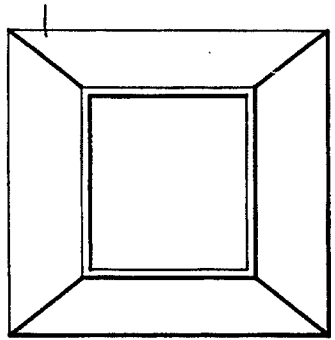
FIGS. 4, 5 and 6 are top plan views of connecting fittings which may be used at the upper and lower ends of FIG. 2 and illustrating connecting fittings by which rectangular, circular and square downspout sections may be connected to the downspout water adaptor portion of the invention.
Figure 5:
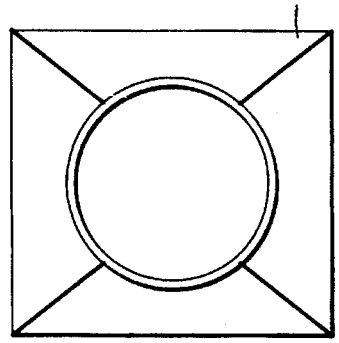
Figure 6:
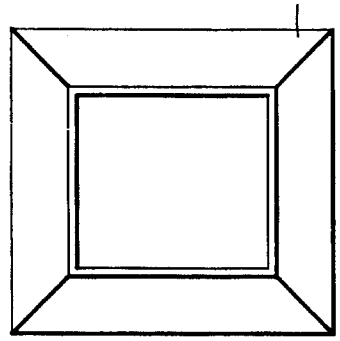

The downspout 34 and elbow 42 illustrated in FIGS. 1 and 2 are substantially rectangular in configuration and the adaptor 44 illustrated in FIG. 2 has a plan configuration such as that illustrated in FIG. 4. However, if the downspout 34 and elbow 42 are circular, the adaptors 44 and 46 have a plan configuration such as that illustrated at 44A in FIG. 5. On the other hand, if the downspout 34 and elbow 42 are square in cross section, the adaptor 44 has a plan configuration such as that illustrated at 44B in FIG. 6.

The adaptor 38 includes opposite outer and inner walls 48 and 50 interconnected by opposite side walls 52 and 54. In addition, an upstanding transverse weir panel 56 extends between the side walls 52 and 54 and is spaced slightly inwardly of the inner wall 50. The weir panel 56 terminates upwardly a spaced distance below the upper end of the body 40 and extends downwardly to the lower open end of the body 40. The upper end of the body 40 also is open and includes an inclined baffle panel 58 extending inwardly and downwardly from the upper end of the inner wall 50 between the side walls 52 and 54 to a point spaced slightly above and inwardly of the upper end of the weir panel 56.

The body 40 includes a tubular inlet fitting 60 opening inwardly to the interior of the body 40 through the outer wall 48 at a level spaced approximately ⅓ the height of the body 40 above the lower end thereof. The fitting 60 extends outwardly of the outer wall 48 and may be of any suitable construction such that the male discharge end 62 of a garden hose 64 or the like may be removably sealingly communicated therewith through the utilization of suitable coupling structure 66.

In addition, the side walls 52 and 54 include tubular outlet fittings 68 and 70 opening outwardly thereof, the fittings 68 and 70 being coupled to plastic water delivery pipes 72 and 74 through the utilization of a fitting 76 and an elbow 78.

The water delivery pipe 74 communicates the interior of the body 40 interposed in the downspout 34 with the interior of the body 40 interposed in the downspout 36, although the end of the water delivery pipe 74 adjacent the body 40 interposed in the downspout 36 could be capped and the outlet fitting 68 of the body 40 interposed in the downspout 36 could be capped.

The weir panel 56 divides the interior of the body 40 into upstanding inner and outer chambers 80 and 82. The lower ends of the chambers 80 and 82 open downwardly into the adaptor 46, the upper end of the chamber 80 is shielded by the baffle panel 58 and the inlet and outlet fittings 60, 68 and 70 all open into the chamber 82.

The opposing surfaces of the side walls 52 and 54 and the surface of the weir panel 56 opposing the outer wall 48 include interconnecting inwardly projecting ribs 84 and 86 suitably grooved as at 88 and 90 in horizontal alignment with a horizontal slot 92 formed in the outer wall 48 to define a guideway for slidingly receiving marginal edge portions of a valve member plate 94 shiftable between a closed position such as that illustrated in solid lines in FIG. 2 and an open position such as that illustrated in phantom lines in FIG. 2.

When in the closed position the valve member plate 94 closes the bottom of the chamber 82 below the fittings 60, 68 and 70 and prevents the discharge of water from the lower end of the chamber 82 into the adaptor 46. However, when the valve member plate 94 is in the phantom line position thereof illustrated in FIG. 2, rain water flowing downwardly through the downspout 34, strikes the baffle panel 58 and is deflected into the chamber 82 and discharged directly from the lower end of the chamber 82 into the adaptor 46.

When the vegetation 96 along the wall 26 and under the eaves 20 has been sufficiently watered and rain is expected, the valve member plate 94 is placed in the dotted line position thereof illustrated in FIG. 2 in order that rain subsequently falling upon the roof structure 12, being collected in the gutters 28, 30 and 32 and passing downwardly through the downspouts 34 will pass directly through the chambers 82 in the bodies 40 for discharge from the elbows 42 onto the ground 98 at the corners of the building 10. However, when rain is imminent and the vegetation 96 needs watering, (assuming the garden hose 64 has been removed and the tubular inlet fittings 60 have been capped), the valve member plates 94 are pushed inwardly to the solid line position thereof illustrated in FIG. 2 in order to close the lower ends of the chambers 82. Then, when rain water subsequently flows downwardly through the downspouts 34 and 36 and into the chambers 82, discharge of the rain water from the lower ends of the chambers 82 is blocked and the rain water begins to fill up the chambers 82. When the level of rain water in the chambers 82 reaches the outlet fittings 68, the rain water flows outwardly through the fittings 68 and into the water pipe 74 and is discharged therefrom through horizontal water outlets 100 spaced along the pipe 74. The outlets 100 will discharge water therefrom at a combined flow rate which is predetermined according to the number of outlets 100 and the flow rates thereof. If water flowing down the downspouts 34 and 36 exceeds the flow rate of water which may be discharged from the outlets 100, the water level in the chambers 82 increases until such time as it rises above the upper marginal edges of the weir panels 56. At this point the excess water will flow over the weir panels 56 and into the chambers 80 for discharge from the lower ends thereof directly into the discharge elbows 42.

In the event the vegetation 96 is in need of water and rain is not imminent, one or both of the tubular inlet fittings 60 is uncapped and the discharge end of at least one garden hose 64 may be coupled to a corresponding inlet fitting 60 through the use of the associated coupling structure. Water may then be supplied to the chamber 82 through the garden hose 64 at a rate slightly below the combined flow rate of discharge of water from the outlets 100. In this manner, the vegetation 96 outwardly of the wall 26 may be properly watered without having water being sprayed on the exterior of the wall 26 or the window 102 therein. Thus, it may be seen that the adaptors 38 have three modes of operation.

It should of course be noted that the flow rates of the fittings 60, 68 and 70 may be varied according to the length of the walls of the associated building. Further, the horizontal cross sectional area of the channels 80 and 82 may be varied according to the plan area of the roof structure and the number of downspouts 34 and 36 provided therefor. Also, the valve member plates 94 may be substituted for by other types of valves such as rotary ball valves.

The foregoing is considered as illustrative only of the principles of the invention. Further, since numerous modifications and changes readily will occur to those skilled in the art, it is not desired to limit the invention to the exact construction and operation shown and described, and accordingly, all suitable modifications and equivalence may be resorted to falling with the scope of the invention.

What is claimed as new is as follows:

1. In combination, a building structure having a roof structure assembly thereover and gutter means including at least one downspout for collecting water draining from said roof assembly, said downspout including an upper end for receiving collected water from said gutter means and an open lower end for discharging therefrom, closure means for selectively closing said lower end, water discharge means above said closure means for discharging water from within said downspout above said closure means, elongated water conveying means extending generally horizontally along said building structure above ground level and provided with irrigation water outlet means spaced therealong, means communicating said water discharge means with said water conveying means, said downspout, above said lower end, defining a pair of side-by-side upwardly opening compartments, water diverter means operative to divert at least a majority of water flowing downward through said downspout above said compartments into one of said compartments, said closure means selectively closing the lower portion of said one compartment from said open lower end, the other of said compartments opening downwardly into said open lower end.

2. The combination of claim 1 including water inlet means operative to receive water into the interior of said one compartment.

3. The combination of claim 2 wherein said closure means includes a generally horizontal closure plate shiftable laterally of said lower end.

* * * * *